United States Patent [19]

Callsen et al.

[11] Patent Number: 4,856,143
[45] Date of Patent: Aug. 15, 1989

[54] APPARATUS FOR SKINNING POULTRY CARCASSES

[75] Inventors: Hans Callsen, Bad Schwartau; Peter Muuss, Lübeck, both of Fed. Rep. of Germany

[73] Assignee: Nordischer Maschinenbau Rud. Baader GmbH+CO KG, Lubeck, Fed. Rep. of Germany

[21] Appl. No.: 260,790

[22] Filed: Oct. 21, 1988

[30] Foreign Application Priority Data

Oct. 28, 1987 [DE] Fed. Rep. of Germany ....... 3736401

[51] Int. Cl.[4] .................. A22C 21/00; A22B 5/16
[52] U.S. Cl. ............................. 17/11; 17/21; 17/50
[58] Field of Search ............ 17/11, 50, 21, 1 G

[56] References Cited

U.S. PATENT DOCUMENTS

| 4,118,829 | 10/1978 | Harben, Jr. | 17/11 A |
| 4,459,721 | 3/1984 | Hill | 17/11 |
| 4,610,051 | 9/1986 | Martin et al. | 17/50 |
| 4,697,307 | 10/1987 | Martin et al. | 17/11 |
| 4,723,339 | 2/1988 | van der Nieuwelaar et al. | 17/11 |

FOREIGN PATENT DOCUMENTS

| 8302207 | 1/1985 | Netherlands | 17/11 |
| 8502785 | 5/1986 | Netherlands | 17/11 |

*Primary Examiner*—Willis Little
*Attorney, Agent, or Firm*—Thomas R. Morrison

[57] ABSTRACT

An apparatus for skinning poultry carcasses, particularly the breast portions thereof is described, from which the wings have been removed. It is the task to suggest a unit integratable into a processing line, which is able to remove the skin in one piece. To achieve this aim the skinning tool has a pair of cone-shaped, meshing and rotating toothed rollers, which can be moved apart mutually and reciprocally counter to spring tension without losing their engagement. By means of a sensor and as a function of the size of the particular poultry carcass, the complete unit is brought into its working position.

18 Claims, 1 Drawing Sheet

APPARATUS FOR SKINNING POULTRY CARCASSES

BACKGROUND OF THE INVENTION

1. Field of the Invention

Apparatus for skinning poultry carcasses or parts thereof, particularly breast portions gained by a crosscut extending substantially perpendicularly to the plane of symmetry and transeversely through the backbone between the lower and upper extremities, in which portions the upper extremities have been removed, using a skinning tool comprising a pair of toothed rollers with meshing, toothed webs and driven to rotate in opposing directions.

2. Prior Art

At present both autarchic apparatuses and those integrated into processing lines are used, in which the skinning tool comprises a pair of oppositely rotating, driven, cylindrical, toothed rollers with meshing, toothed webs of coarse pitch or steep threads. For skinning purposes the poultry carcasses are brought into contact with the meshing gap of said toothed rollers, so that the skin is removed by continuous drawing in. However, it is disadvantageous that the skinning process often does not take place in a spontaneous manner and instead tool engagement is frequently only possible through turning on edge and turning over the poultry carcass. The reason for this is that the conveying meshing gap is set back with respect to the bearing surface of the poultry carcass defined by the common tangent plane on the toothed rollers roughly by the amount of the radius of the toothed rollers and consequently the carcass must be deformed correspondingly in order to initiate the skinning process. It is also disadvantageous that during or bythis process the skin is destroyed, which counteracts the intention to use this skin as a continous, edible envelope or case for various food products.

An apparatus having the aforementioned functional elements is known from U.S. Pat. No. 4,610,051. This apparatus used for removing the skin from turkey legs has two pairs of parallel, juxtaposed, cylindrical rollers with helically extending, toothed webs, which mesh with one another. The turkey legs are engaged on a pointed bar in such a way that the latter penetrates between the skin and the leg meat, the latter being above and the former below the pointed bar. Through further forcing onto the same, the turkey leg passes into the area of a conveyor arranged above the cylindrical roller pairs, which conveyor firstly conveys the turkey legs to a cutting mechanism for slitting the skin and finally to the cylindrical roller pairs. The skin flaps freed by said slitting and the penetration of the pointed bar pass into the meshing gaps between the cylindrical rollers, so that the skin is removed. Thus, once again no continuous skin envelope can be obtained.

OBJECTS OF THE INVENTION

It is the primary object of the present invention to obviate the known disadvantages and to obtain the skin in one piece during the skinning of poultry carcasses or parts thereof. It is a particular object of the invention to ensure a reliable engagement on the skin of such poultry carcasses or parts.

SUMMARY OF THE INVENTION

In a poultry skinning apparatus using a skinning tool comprising a pair of toothed rollers with meshing, toothed webs and driven to rotate in opposite directions these objects are achieved, according to the invention, in that the toothed rollers are conical. The toothed webs are preferably inclined to extend obliquely with respect to the generatrixes of the toothed roller cones and at least one of the two toothed rollers can be driven and can be displaced pivotably by the other, counter to the tension of a spring, about an axis arranged in the vicinity of the largest diameter of said other roller and at perpendicularly to the plane of the axes of the toothed rollers. The advantages of the solution according to the invention are that the conveying meshing gap of the toothed rollers, as a result of the conical shape, is substantially located in the common tangent plane on said rollers in the vicinity of the cone apices, so that the skinning process starts directly when contact is made with the skin, i.e. in the initial stage of engagement thereof. The entry or draw-in zone widens into the larger diameter areas of the toothed rollers, so that the skinning process takes place at a constantly increasing speed and therefore in a careful manner, whilst the gaining of undestroyed skin is made possible as a result of the forcing apart of the toothed rollers by the skin.

The skinning tool according to the invention can advantageously be integrated into an apparatus including a conveyor defining a plane of revolution with mounting supports for receiving the poultry carcasses or parts thereof and whilst orienting or aligning its plane of symmetry substantially parallel to the plane of revolution and the base plate of the breast-bone substantially parallel to the path of the conveyor, the apparatus being expediently characterized by an arrangement of the toothed rollers of the skinning tool alongside the conveyor path, such that the contact line of the toothed rollers is located in the plane of revolution of the conveyor, the flanks of the toothed rollers facing the conveyor being substantially parallel to the path and the cone apices being oriented counter to the movement direction of the conveyor.

In order to permit adaptation of the skinning tool to different poultry carcass sizes, the skinning tool can be mounted adjustably in the plane of revolution of the conveyor and whilst retaining the orientation of the toothed rollers, the mounting of the skinning tool taking place by two rods forming a parallelogram.

Automation of the adaptation can be brought about by a detecting or sensing projecting into the path of the poultry carcass in the plane of revolution of the conveyor and upstream of the cone apices of the toothed rollers and which can be displaced by said carcass for a control of the working position of the skinning tool adapted to the size of the poultry carcass or parts thereof to be processed. The working position of the skinning tool is preferably derived from the maximum deflection of the sensing device. According to an advantageous embodiment the control of the skinning tool can take place by a cam gear rotating synchronously with the conveyor or its mounting supports, the respective working position of the skinning tool being obtainable by lowering it onto a stop adjusted by the sensing device, respectively.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings

DETAILED DESCRIPTION OF THE PREFERRED EMBODIMENTS

Figure 1:
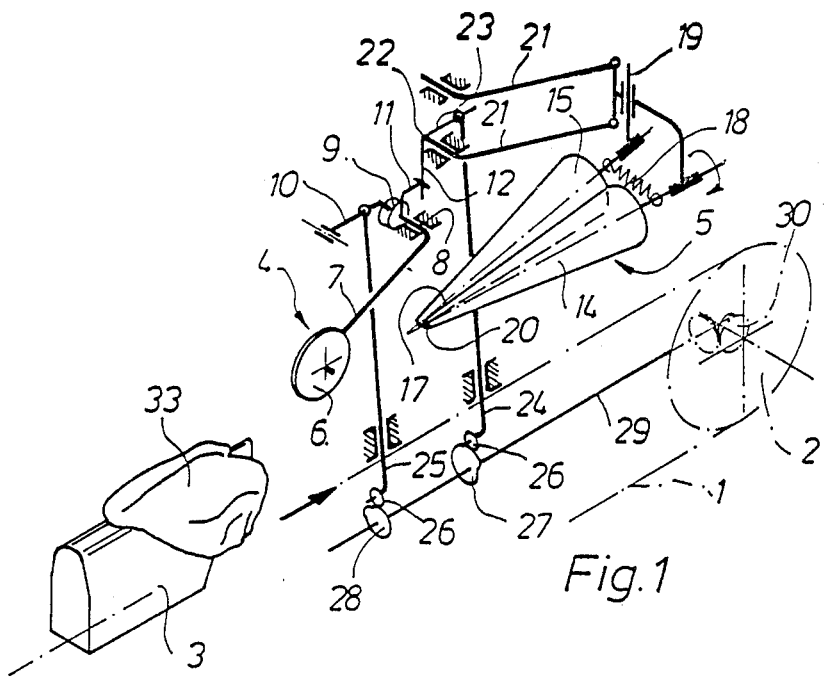
FIG. 1 shows a diagrammatic view of the skinning apparatus in an axonometric representation.
Figure 2:
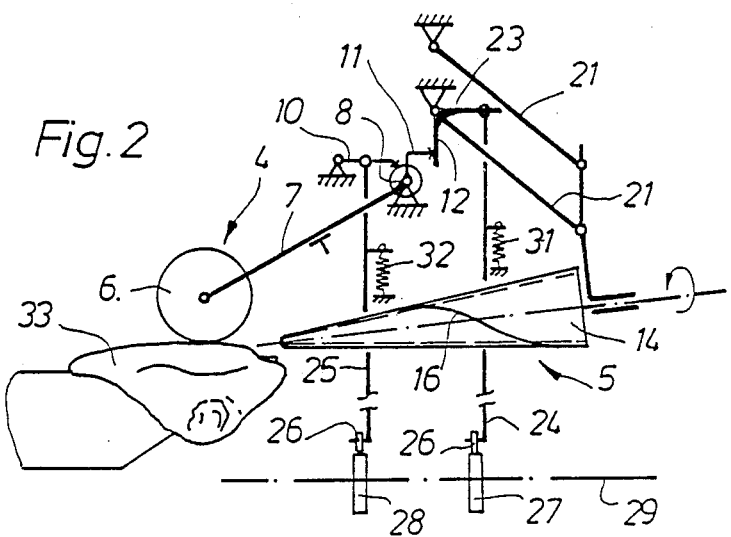
FIG. 2 shows a diagrammatic side view of the apparatus.

The skinning apparatus according to the invention as shown in FIG. 1 is mounted on a not-shown frame, in which an only intimated conveyor 1 guided by two guide or deflection pulleys 2 and e.g. constituted by a continuously rotating chain is driven to revolve in an appropriate way. Conveyor 1 is equipped with mounting supports in the form of support saddles 3, which receive poultry carcasses 33 to be processed with their breastbone in the conveying direction and whilst supported on the inside thereof. A detector or sensor 4 is located over the path of the support surface of the support saddles 3 upstream of a skinning tool 5 and comprises a sensing roll 6, which is arranged on a swivel arm 7, which is inclined with respect to the conveying direction of conveyor 1 and is pivotably mounted about a horizontal axle 8 in the plane of revolution of conveyor 1 coinciding with the plane of symmetry of the poultry carcass or body 33. The axle 8 carries a freewheel 9, which permits an upward pivoting of the sensor 4 and which has a toothed outer circumference. An arresting lever 10 acting as a rotation preventing means for the freewheel 9 engages in said teeth. The swivel arm 7 is extended to continue beyond the axle 8 in a stop or abutment lever 11, which serves to support a lever extension 12 of the support linkage for the skinning tool 5 described hereinafter. It comprises two juxtaposed, conical toothed rollers 14, 15, whose circumferential surface is provided with steep toothed webs 16 of coarse pitch/ steep thread having a pitch in opposite directions. The cone-shaped toothed rollers 14, 15 with their toothed webs 16 are mounted so as to mesh, i.e. to engage in one another, and they are oriented in such a way that the meshing gap 17 forming the contact line thereof is located in the plane of revolution of conveyor 1 and the tangent plane on the downwardly directing flanks of the toothed rollers 14, 15 is perpendicular to the plane of revolution and parallel to the conveying direction. Toothed roller 14 is driven to rotate in an appropriate manner, the rotation direction giving a draw-in moment effective from bottom to top. The mutual engagement of the toothed rollers 14, 15 takes place under the tension of a spring 18, toothed roller 15 being pivotable about an axle 19 located in the vicinity of the roller's largest diameter, so that a wedge-shaped gap can form and self-adjust, which opens widest at the cone apices 20 formed by the toothed rollers without losing the mutual engagement in the area of the large roller diameter. The bearing housing of the toothed rollers 14,15 is movable in the plane of revolution of conveyor 1 on parallelogram rods 21 arranged in towed manner. On its frameside rod axle 22, one of the rods 21 carries the lever extension 12, which is supported with respect to the stop lever 11, as described hereinbefore. A further lever 23, is fixed in a manner secured against rotation to axle 22 and points in the direction of rod 21. To the free end of lever 23 and the arresting lever 10 engaging in the teeth of the outer part of freewheel 9 are connected connecting rods 24, 25, respectively, which are supported with support rolls 26 on cam disks 27, 28, respectively. The latter are located on a common control shaft 29, which is driven by means of a bevel gear drive 30 by one of the guide pulleys 2 of conveyor 1, so that they rotate synchronously therewith. The support rolls 26 of the connecting rods 24,25 are held by the tension of springs 31, 32, respectively, on the cam disks 27, 28, respectively.

The apparatus functions in the following way:

A breast portion of a poultry carcass or body 33 prepared by an oblique cut made transversally through the backbone between the lower and upper extremities is, after removing the wings, inverted on the support saddles 3 with the breast-bone upwards and the neck part to the front. Continuing the conveying the saddled poultry carcass 33 initially passes under the sensing roll 6 of the sensor 4 and, while swinging upwardly the swivel arm 7 about the axle 8, displaces the roll 6 to a maximum amount corresponding to the maximum thickness of the breast portion. In the course of the swinging-up movement the inner part of the freewheel 9 fixed to the spindle 8 of swivel arm 7 has rotated correspondingly relative to its outer part, which is fixed during this operation. The fixing of the outer part of the freewheel 9 takes place through the arresting lever 10, whose connecting rod 25 connected thereto is supported during this phase by its support roll 26 on a portion of the cam disk 28, which defines a lowered position of the arresting lever 10. After the maximum thickness of the breast portion has passed under sensing roll 6, the latter is prevented by the freewheel 9 arrested on its outer part from following the falling or declining contour of the breast portion, because the blocking action of the freewheel 9 takes place in the rotation direction derived therefrom. In this way the stop lever 11 rigidly connected to the swivel arm 7 of sensor 4 assumes a position corresponding to the maximum thickness of the breast portion. In the meantime, the support saddle 3 has reached the vicinity of the skinning tool 5, which had previously been held in the upper or raised position by means of the connecting rod 24 supported via support roll 26 on cam disk 27. With the further passage of the support saddle 3, i.e. further rotation of the control shaft 29, the cam disk 27 enters with a circumferential portion of smaller radius into the of support roll 26, so that the skinning tool 5 is lowered. This movement continues until the lever extension 12 connected to the lower rod 21 of the support linkage comes to rest on the stop lever 11. The toothed rollers 14, 15 of the skinning tool 5 have now reached the height level of the sensor 4 with their lower flanks and start, in the region of their cone apices 20, to draw-in the skin covering the breast portion into the meshing gap 17. Conveying continues during this process, so that the skin increasingly passes into the larger diameter areas of the toothed rollers 14,15, i.e. is subject to an increasing removal speed. The also increasing skin volume brings about a reciprocal and mutual moving apart of the toothed rollers 14,15 under a tension defined by spring 18, so that skin destruction is prevented. Following the passage of support saddle 3, the skinning tool 5 is brought back into the upper position again via the cam disk 27. Simultaneously the arresting lever 10 is raised by means of the cam disk 28, whereby the sensing roll 6 drops back into its basic position, whilst carrying along the now freed outer poart of the freewheel 9. The new readiness position of the sensor 4 is reached in that the arresting lever 10, shortly prior to the arrival of the next support saddle 3, is again engaged with the teeth of the outer part of freewheel 9.

What is claimed is:

1. An apparatus for processing poultry having lower and upper extremities, a breast including a breastbone and a back, both covered by skin, as well as a backbone, by skinning one of poultry carcasses (bodies), parts thereof and particularly breast portions obtained by a cross- cut extending transversally through the poultry backbone between the lower and upper extremities, in which breast portions the upper extremities have also been removed, the apparatus comprising a skinning tool including a pair of toothed rollers with meshing toothed webs and driven to rotate in opposite directions about a roller axis, wherein said toothed rollers have a conical shape.

2. An apparatus as claimed in claim 1, wherein said toothed webs extend obliquely to the generatrixes of said toothed roller cones.

3. An apparatus as claimed in claim 1, wherein at least one of said two toothed rollers is driven and pivotably displaceable by the other, counter to the tension of a spring, about an axle arranged in the vicinity of the largest diameter of said other roller and perpendicular to the plane of the axes of said toothed rollers.

4. An apparatus as claimed in claim 1, comprising a conveyor defining a plane of revolution as well as a conveying path and a direction of travel, and having mounting supports for receiving said poultry to be processed and for aligning their plane of symmetry substantially parallel to said plane of revolution and said base plate of their breast-bone substantially parallel to said conveying path, wherein the contact line of said toothed rollers is in said plane of revolution of said conveyor, flanks of said toothed rollers facing said conveyor being oriented substantially parallel to said conveying path and apices of said roller cones being oriented counter to said direction of travel of said conveyor.

5. An apparatus as claimed in claim 2, comprising a conveyor defining a plane of revolution as well as a conveying path and a direction of travel, and having mounting supports for receiving said poultry to be processed and for aligning their plane of symmetry substantially parallel to said plane of revolution and said base plate of their breast-bone substantially parallel to said conveying path, wherein the contact line of said toothed rollers is in said plane of revolution of said conveyor, flanks of said toothed rollers facing said conveyor being oriented substantially parallel to said conveying path and apices of said roller cones being oriented counter to said direction of travel of said conveyor.

6. An apparatus as claimed in claim 3, comprising a conveyor defining a plane of revolution as well as a conveying path and a direction of travel, and having mounting supports for receiving said poultry to be processed and for aligning their plane of symmetry substantially parallel to said plane of revolution and said base plate of their breast-bone substantially parallel to said conveying path, wherein the contact line of said toothed rollers is in said plane of revolution of said conveyor, flanks of said toothed rollers facing said conveyor being oriented substantially parallel to said conveying path and apices of said roller cones being oriented counter to said direction of travel of said conveyor.

7. An apparatus as claimed in claim 4, wherein said skinning tool is mounted adjustably in said plane of revolution of said conveyor whilst retaining the orientation of said toothed rollers.

8. An apparatus as claimed in claim 7, wherein two rods forming a parallelogram are provided for mounting said skinning tool.

9. An apparatus as claimed in claim 4, wherein a sensing device is arranged to project into said conveying path of said poultry to be processed in said plane of revolution of said conveyor upstream of said cone apices of said toothed rollers and displaceable by said poultry to be processed for controlling the working position of said skinning tool depending on the size of said poultry to be processed.

10. An apparatus as claimed in claims 7, wherein a sensing device is arranged to project into said conveying path of said poultry to be processed in said plane of revolution of said conveyor upstream of said cone apices of said toothed rollers and displaceable by said poultry to be processed for controlling the working position of said skinning tool depending on the size of said poultry to be processed.

11. An apparatus as claimed in claims 8, wherein a sensing device is arranged to project into said conveying path of said poultry to be processed in said plane of revolution of said conveyor upstream of said cone apices of said toothed rollers and displaceable by said poultry to be processed for controlling the working position of said skinning tool depending on the size of said poultry to be processed.

12. An apparatus as claimed in claim 9, wherein the working position of said skinning tool is derived from the maximum deflection of said sensing device.

13. An apparatus as claimed in claim 10, wherein the working position of said skinning tool is derived from the maximum deflection of said sensing device.

14. An apparatus as claimed in claim 11, wherein the working position of said skinning tool is derived from the maximum deflection of said sensing device.

15. An apparatus as claimed in claim 9, wherein the controlling of said skinning tool takes place by a cam gear revolving synchronously with said conveyor and said mounting supports, the particular working position of said skinning tool being obtained by lowering the same onto a stop adjusted by said sensing device.

16. An apparatus as claimed in claim 10, wherein the controlling of said skinning tool takes place by a cam gear revolving synchronously with said conveyor and said mounting supports, the particular working position of said skinning tool being obtained by lowering the same onto a stop adjusted by said sensing device.

17. An apparatus as claimed in claim 11, wherein the controlling of said skinning tool takes place by a cam gear revolving synchronously with said conveyor and said mounting supports, the particular working position of said skinning tool being obtained by lowering the same onto a stop adjusted by said sensing device.

18. An apparatus as claimed in claim 12, wherein the controlling of said skinning tool takes place by a cam gear revolving synchronously with said conveyor and said mounting supports, the particular working position of said skinning tool being obtained by lowering the same onto a stop adjusted by said sensing device.

* * * * *